United States Patent [19]

Popov et al.

[11] Patent Number: 4,658,167

[45] Date of Patent: Apr. 14, 1987

[54] ROTOR WITH PERMANENT MAGNETS FOR AN ELECTRICAL MACHINE

[75] Inventors: Entcho N. Popov; Rumen K. Apostolov; Georgi A. Georgiev; Hristo B. Katzarov; Julii S. Penkov, all of Sofia, Bulgaria

[73] Assignee: DSO "ELPROM", Sofia, Bulgaria

[21] Appl. No.: 738,596

[22] Filed: May 28, 1985

[51] Int. Cl.$^4$ .................. H09K 1/28; H09K 21/08
[52] U.S. Cl. ..................................... 310/156; 310/261
[58] Field of Search ............... 310/42, 156, 216, 217, 310/218, 261

[56] References Cited

U.S. PATENT DOCUMENTS 4,543,506  2/1985  Kawada et al. ................. 310/261

FOREIGN PATENT DOCUMENTS 52-53204  4/1977  Japan ................................. 310/156

Primary Examiner—Patrick R. Salce
Assistant Examiner—D. L. Rebsch

[57] ABSTRACT

A rotor for an electrical machine with tangentially oriented permanent magnets between which pole pieces are arranged, the rotor featuring radial axes of the arcs of the pole pieces arranged between the radial axes of the pole piece cores and the radial axes of the magnets., the above arcs partially and unilaterally overlapping the magnets. The longitudinal axes of the pole piece arcs alternate in position to form a broken line while the longitudinal axes of the pole piece cores and of the magnets are aligned to form continuous lines. This reduces the magnetic dissipation flux and the unevenness of rotation of the machine.

2 Claims, 2 Drawing Figures

ROTOR WITH PERMANENT MAGNETS FOR AN ELECTRICAL MACHINE

BACKGROUND OF THE INVENTION

The invention relates to a rotor with permanent magnets for an electrical machine.

It is known to provide a rotor with tangentially oriented permanent magnets and pole pieces arranged between them. The magnets are radially secured by means of non-magnetic cotters driven into grooves provided in the upper part of the lateral surfaces of the pole pieces. The disadvantage of this construction described above is that it is impossible to ensure a value for the distance between the poles greater than the tangential dimension of the magnet without reducing the radial dimension of the magnet. This results in a reduction of the density coefficient of the magnetic flux, i.e. a reduction of the effective magnetic flux in the gap.

It is also known to provide rotor with tangentially oriented magnets and pole pieces arranged between them, where the pole terminals are provided with little rims under which are placed T-clamps which tighten the rims and radially secure the magnet. The disadvantage of this construction is that an increase of the distance between the poles greater than the tangential dimension of the magnet results in a considerable magnetic dissipation flux in the gap between the poles, which hampers the commutation of the machine. The construction does not make it possible for the Longitudinal axes of the arcs of the pole pieces to alternate in position and thus form a broken line which is necessary for reducing the uneven rotation of the machine. The term pole piece arc as used herein means the curved portion of the pole piece farthest from the axis of the rotor.

It is also known to provide a rotor comprising modular packs, each consisting of pole pieces whose inside ends are founded in a sleeve of non-magnetic material and tangentially oriented permanent magnets mounted in semi-closed grooves formed by the pole pieces. The modular packs can be arranged in such a way as to make it possible for the longitudinal axes of the arcs of the pole pieces alternate in position to form broken lines. The shortcoming of this construction is that, in this case, the longitudinal axes of the magnets also alternate in position and form broken lines which leads to an increase of the dissipation flux of the magnets.

SUMMARY OF THE INVETION

The aim of the present invention is to provide a rotor with tangentially oriented permanent magnets and pole pieces between them, where the chosen value for the length of the pole piece arc does not affect the radial dimension of the magnet in view of increasing the effective magnetic flux, reducing the dissipation flux in the commutation area, eliminating the axial dissipation flux and also reducing the unevenness of rotation of the machine.

This aim is achieved by arranging pole pieces between the tangentially oriented rotor magnets so that the radial axes of the pole pieces' arcs are situated between the radial axes of the pole pieces' cores and the axes of the magnets. The pole pieces' arcs partially and unilaterally overlap the magnets.

The advantages of the rotor according to the invention are that the shape of the pole pieces makes it is easy to ensure any size of the pole piece arc without affecting the radial dimension of the magnet and without giving rise to a considerable dissipation flux in the gap between the poles. By alternately rotating the pole pieces at 180° around its core's radial axis it is possible to obtain alternating positions of the longitudinal axes of the pole piece arcs without alternating the position of the longitudinal axes of the pole piece cores and the magnets. This results in a decreased unevenness of rotation of the machine without causing an increase of the dissipation flux of the magnets. The magnets are mechanically secured in radial direction.

BRIEF DESCRIPTION OF THE DRAWINGS

With these and other objects in view, which will become apparent in the following detailed description, the present invention, which is shown by example only, will be clearly understood in connection with the accompanying drawing, in which.

DETAILED DESCRIPTION OF THE DRAWINGS

Figure 1:
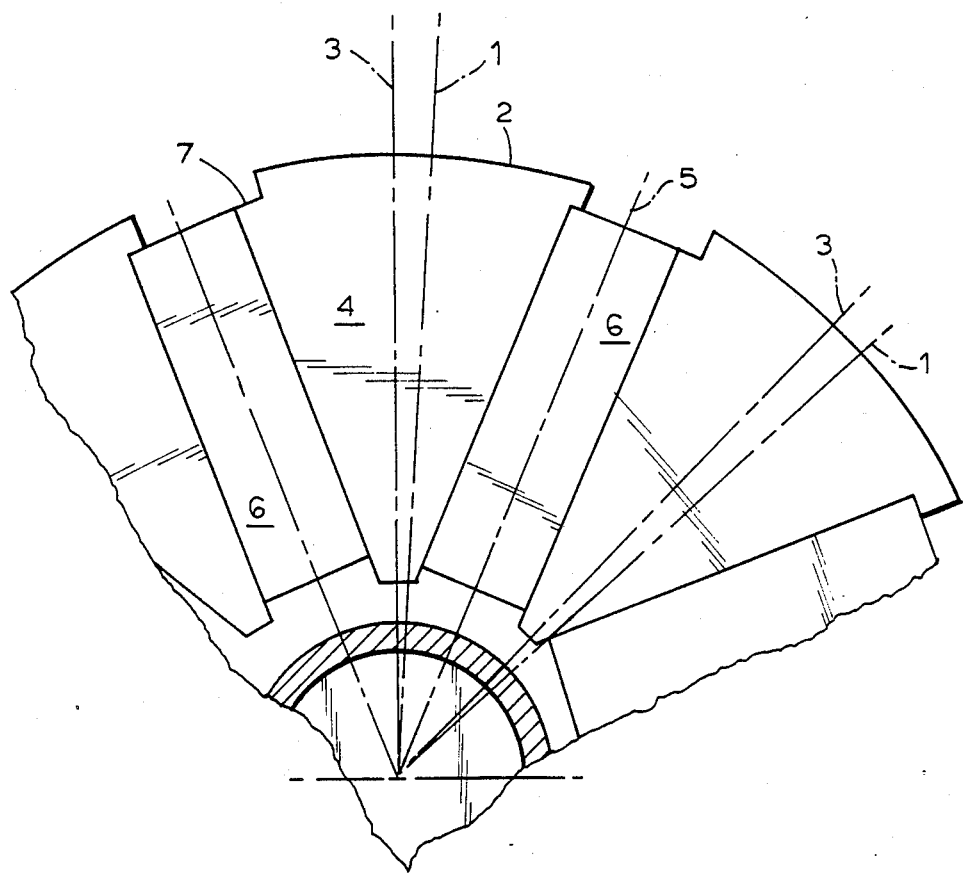
FIG. 1 is a cross-sectional view of the rotor.

Referring to FIG. 1, the axes 1 of the pole piece arcs 2 are arranged between the radial axes 3 of the core of the pole piece 4 and the radial axes 5 of the permanent magnets 6. The pole piece arcs 2 partially and unilaterally overlap the magnets 6. In order to reduce the magnetic dissipation flux in the gap between the poles, the magnet terminal is radially cut in its upper section 7 even outside the piece arc.

Figure 2:
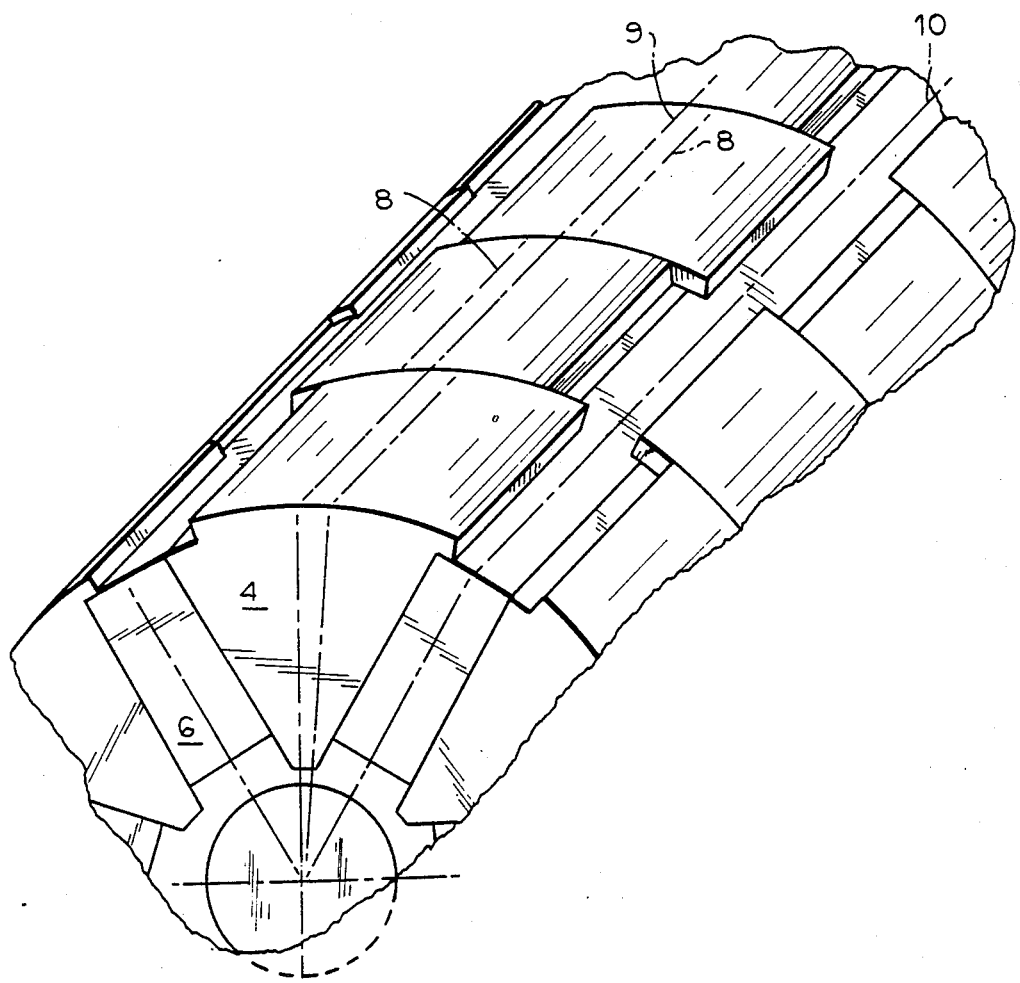
FIG. 2 is a perspective view of the rotor with axes of the pole piece arcs alternating in position, thus forming a broken line.

Referring to FIG. 2, the longitudinal axes 8 of the pole piece arcs alternate in position and form a broken line, while the longitudinal axes 9, 10 of the cores of the pole pieces 4 and of the magnets 6 are aligned and form continuous lines.

On a rotor with tangentially directed permanent magnets and pole pieces between them, the radial axes of the pole piece arcs are arranged between the radial axes of the pole piece cores and the magnets, and the pole piece arcs partially and unilaterally overlap the magnets. The choice of length for the pole piece arcs does not affect the radial dimension of the magnets, i.e. it does not cause a drop of the magnetic flux. It is therefore possible for the longitudinal axes 8 of the pole piece arcs to be alternated to form a broken line while the longitudinal axes 9, 10 of the pole piece cores and the magnets remain aligned in straight, continuous lines. This reduces the unevenness of rotation of the machine.

We claim:

1. An electrical machine rotor comprising a central shaft,
   a plurality of permanent magnets arranged equi-angularly and radially equidistant about said shaft, said magnets being substantially parallelpiped in shape and extending along the length of the shaft,
   a plurality of pole pieces, each of which is placed between two adjacent magnets, said pole pieces being of substantially wedge shape, thereby having two linear sides defining an angle and an arc, said arc being the outer peripheral surface of said pole piece, said linear sides being the portions of the pole piece adjacent to said magnets,
   each of said pole pieces being cut such that its arc has an angular recess at one linear side where the arc has the same radial dimension as its adjacent magnet, and an angular projection at the other linear side where said arc partially overlaps its adjacent magnet, each magnet being flanked on one side by an overlapping pole piece arc and on the other side by a pole piece arc having the same radial dimension as said magnets.

2. A rotor as claimed in claim 1, wherein each of said pole pieces extend along only a part of the length of said shaft and a plurality of pole pieces are adjacently located between each two adjacent magnets along the length of said shaft, each adjacent pole piece being oppositely oriented such that adjacent pole piece arcs do not overlap the same magnet.

* * * * *